United States Patent [19]

Kihm

[11] Patent Number: 4,690,168
[45] Date of Patent: Sep. 1, 1987

[54] VALVE ACTUATOR POSITION INDICATING SYSTEM

[75] Inventor: Joe A. Kihm, Churchville, Pa.

[73] Assignee: Harold Beck & Sons, Inc., Newtown, Pa.

[21] Appl. No.: 661,575

[22] Filed: Oct. 16, 1984

[51] Int. Cl.$^4$ ............................................. F16K 37/00
[52] U.S. Cl. ................................. 137/554; 251/129.11; 251/228; 251/279; 340/870.35
[58] Field of Search .......... 251/279, 234, 228, 129.11, 251/305; 137/554; 340/870.33, 870.35, 870.36

[56] References Cited

U.S. PATENT DOCUMENTS

| | | | |
|---|---|---|---|
| 2,494,493 | 1/1950 | Schaevitz | 171/119 |
| 2,908,478 | 10/1959 | Starrett | 251/279 |
| 3,141,120 | 7/1964 | Johnson et al. | 318/18 |
| 3,351,952 | 11/1967 | Kobold et al. | 340/187 |
| 3,355,278 | 11/1967 | Smith | 137/554 |
| 3,546,570 | 12/1970 | Bullock | 323/48 |
| 3,555,542 | 1/1971 | Guiot | 340/347 |
| 3,602,254 | 8/1971 | Fawkes | 340/196 |
| 3,789,876 | 2/1974 | Kempton et al. | 340/282 |
| 3,810,136 | 5/1974 | Long et al. | 340/870.35 |
| 3,850,196 | 11/1974 | Fales | 137/554 |
| 3,929,058 | 12/1975 | Smith | 92/13 |
| 3,982,725 | 9/1976 | Clark | 251/14 |
| 3,985,151 | 10/1976 | Smith | 137/269 |
| 4,013,911 | 3/1977 | Fujiwara et al. | 340/870.35 |
| 4,023,432 | 5/1977 | Killian | 74/424.8 |
| 4,083,237 | 4/1978 | Lenesque | 340/870.35 |
| 4,156,437 | 5/1979 | Chivens et al. | 137/554 |
| 4,216,795 | 8/1980 | Cobb et al. | 137/554 |

FOREIGN PATENT DOCUMENTS 503374  9/1947  Canada ......................... 251/129.11

*Primary Examiner*—A. Michael Chambers
*Attorney, Agent, or Firm*—Woodcock Washburn Kurtz Mackiewicz & Norris

[57] ABSTRACT

A valve actuator for controlling and sensing the rotational position of a valve member includes a positional indicator for sensing the angular position of an actuator shaft, the positional indicator shaft being inductively coupled to a positional indicator circuit. A rotor/stator assembly is provided with a stator such that rotational positions may be sensed as the positional indicator shaft turns through angles which exceed 90°.

8 Claims, 6 Drawing Figures

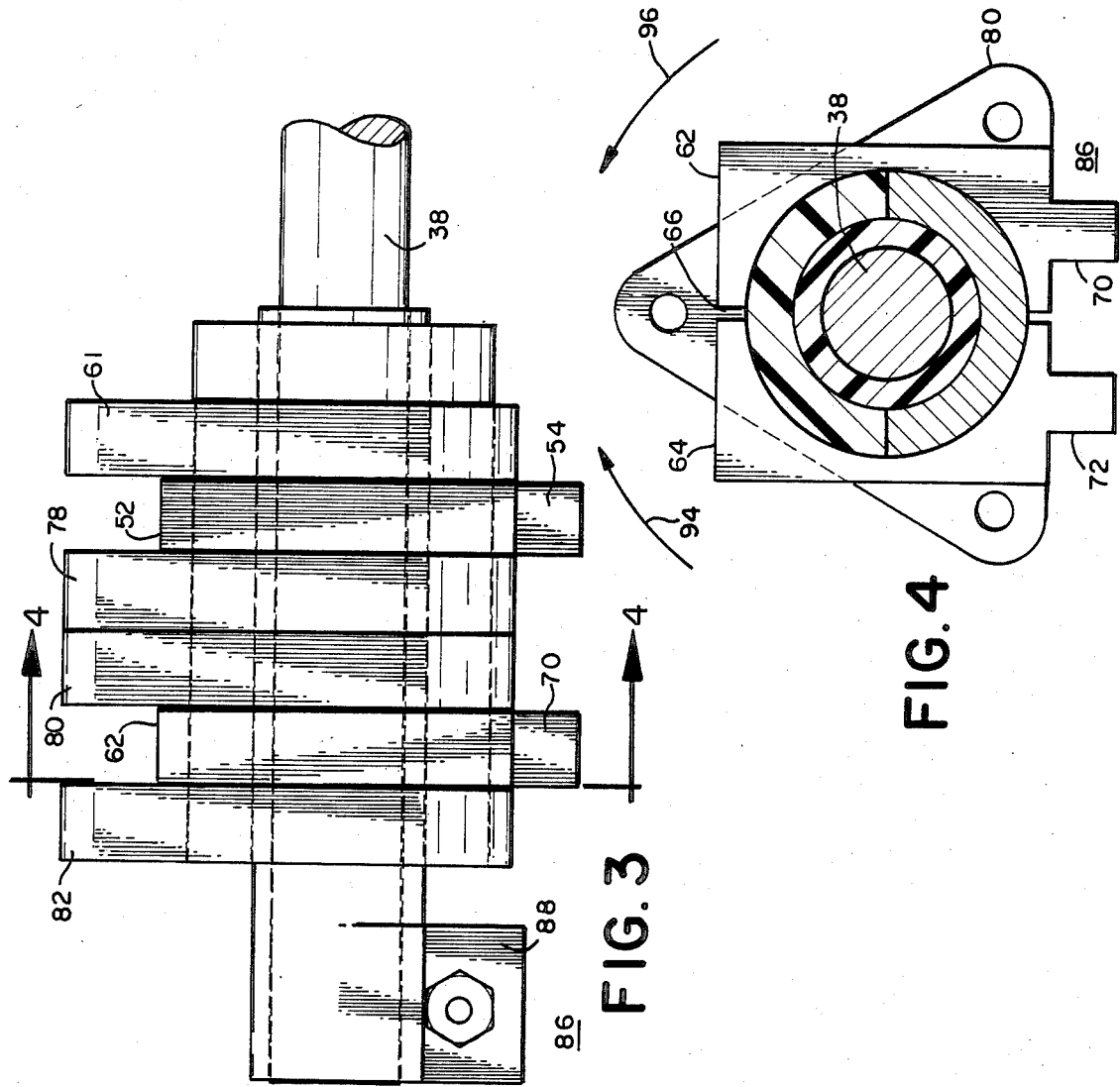

VALVE ACTUATOR POSITION INDICATING SYSTEM

FIELD OF THE INVENTION

The present invention relates in general to valve actuators and, in particular, relates to a valve actuator having an improved position indicator mechanism.

In the control of fluid flow in many applications, it is particularly important to precisely control the position of a valve mechanism. For example, in the automatic control of a petroleum refinery, it is particularly important that each valve in the refinery be opened and closed at the appropriate time and to the appropriate degree. To accomplish this result, valves of the ball, plug and butterfly type are typically equipped with automatic valve actuators. Automatic valve actuators are electric motors which, upon actuation, rotate a shaft. The shaft, in turn, is coupled to a mechanical linkage. The mechanical linkage, in turn, is coupled to the valve mechanism which is to be controlled. As will be more fully explained below, the valve actuator may be required to reliably close the valve against great fluid pressures. For this reason, valve actuators require high torque. To keep the size of the electric motor of the valve actuator limited, it is necessary that the mechanical linkage which couples the valve actuator shaft to the valve mechanism provide a mechanical advantage. For reasons which will also be more fully explained below, mechanical advantage is achieved if the output shaft of the electric motor of the valve actuator rotates through an angle which exceeds the angle through which the valve mechanism must turn. With most valve mechanisms, the valve must turn through an angle of 90° in order to be rotated from the full open position to the completely closed position. Thus, the shaft of the valve actuator is required to turn through an angle which exceeds 90° if any mechanical advantage is to be obtained.

It is not only important that the valve actuator be able to control valves precisely with high torque, but also that the valve position be precisely known and controlled at all times. Accordingly, rotary valve actuators have typically been provided with position indicators which provide an electrical output which varies in proportion to the position of the valve mechanism. In the prior art, rotary positional indicators for valve actuators were typically either of the resistive type or were capacitively coupled to the valve actuator output shaft.

With positional indicators in prior art valve actuators of the resistive type, a wiper contact was made between the shaft whose position was to be sensed and the positional indicating circuit. Valve actuators, however, are utilized in particularly harsh environments and, therefore, corrosion at the wiper contact has been known to cause errors in the rotary position indication.

Because of the corrosion problems associated with positional indicators using resistors, capacitive coupling has been proposed between the shaft whose position is to be sensed and the rotary positional indicator circuits of the prior art. With valve actuators employing capacitively coupled positional indicators, the sensed capacitance varies with the rotary position of the output shaft of the valve actuator. Unfortunately, however, this capacitance also varies with ambient humidity. Accordingly, errors have been introduced in valve actuators employing positional indicators utilizing capacitive coupling.

To eliminate the corrosion problems associated with valve actuators employing resistive positional indicators and the humidity problems associated with valve actuators employing capacitive positional indicators, it would be desirable to employ inductive coupling between the valve actuator shaft and the positional indicator.

In U.S. Pat. No. 3,602,254—Fawkes, a valve mechanism employing an inductively coupled rotary positional indicator is disclosed. In the Fawkes valve position indicating system, a first magnetic pole piece and coil are energized to create a field which is sensed by a second pick-up coil. A valve shaft situated between the two coils employs a magnetic conducting portion. The degree of magnetic coupling between the two coils is a function of the rotary position of the valve shaft. The Fawkes positional indicating system, while suitable for a valve mechanism as described therein, is not suitable for a valve actuator which controls that valve mechanism. The Fawkes et al system provides positional indication only for shaft rotations of 90° or less. As explained above, a valve actuator is required to drive a shaft which rotates through angles which exceed 90°. For this reason, the Fawkes system is inadequate to measure rotary position with a valve actuator inasmuch as shaft rotations greater than 90° are required if a mechanical advantage is to be achieved.

It would be desirable to provide a valve actuator mechanism having a positional indicator system which is capable of sensing shaft rotations exceeding 90°.

It would also be desirable to provide a valve actuator having a positional indicator which did not suffer from corrosion problems caused by the harsh environments in which the valve actuator was to operate.

It would also be desirable to provide a valve actuator employing a positional indicator which provides an output signal which is unaffected by ambient humidity.

SUMMARY OF THE INVENTION

These and other objectives are achieved by the valve actuator of the present invention. The valve actuator of the present invention controls and senses the rotational position of a valve member rotating to an angle of at least 90° and includes an actuator motor for rotating an actuator shaft and an actuator arm coupled to that shaft, the rotation of the actuator shaft causing rotation of the actuator arm. A linkage connects the actuator arm to the valve mechanism, and the rotation of the actuator arm causing movement of the linkage and, in turn, rotation of the valve member. In accordance with the present invention, a positional indicator means is provided which senses the angular position of the actuator shaft. The positional indicator means includes a positional indicator shaft which is coupled to the actuator shaft such that the angle of rotation of the actuator shaft causes a corresponding angular rotation of the positional indicator shaft. A rotor/stator assembly is provided which includes a rotor coupled to the positional indicator shaft and a stator, the rotor being rotationally mounted with respect to the stator, the rotor varying the inductive coupling with the stator. A positional indicator circuit is provided which is responsive to the rotor/stator assembly for generating an output signal which varies in accordance with the angular position of the rotor and, therefore, in accordance with the angular position of the actuator shaft. The foregoing arrangement is not sensitive to humidity as in the case of capacitively coupled positional indicators and is further not sensitive to corrosion and wear as are prior art resistive positional indicators.

In accordance with one aspect of the present invention, the rotor/stator assembly includes a stator having a first sensing pole piece which partially surrounds the rotor and a second sensing pole piece wich partially surrounds the rotor, the first and second pole pieces together substantially completely surround the rotor. The rotor is provided with a magnetically active sector and a magnetically inactive sector. The positional indicator circuit includes a demodulator means which generates a signal proportional to the difference between the current induced in the first sensing pole piece and the current induced in the second sensing pole piece. In this manner, the rotor/stator assembly of the present invention senses shaft rotations exceeding 90°.

BRIEF DESCRIPTION OF THE DRAWINGS

The present invention will be more fully understood by reference to the accompanying drawings, in which:

FIG. 3 is a cross-sectional view of the rotor and stator of the positional indicator of FIG. 2 taken along section lines 3—3 thereof;

FIG. 4 is a cross-sectional view of the rotor and stator assemblies of FIG. 3 taken along section lines 4—4 thereof;

DETAILED DESCRIPTION OF THE PREFERRED EMBODIMENT

Figure 1:
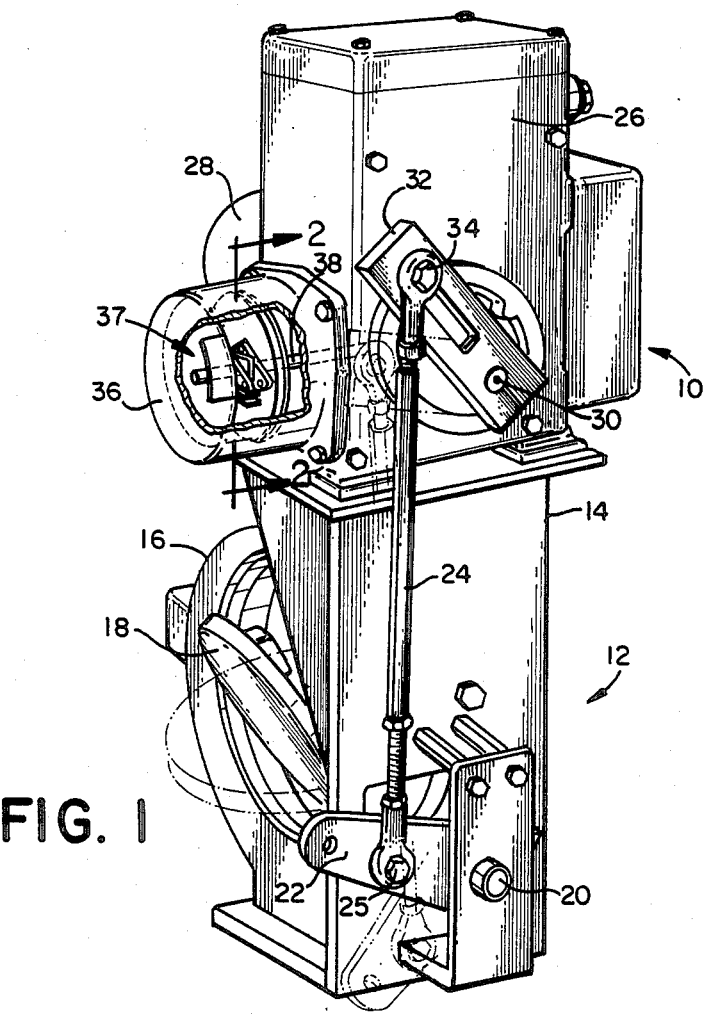
FIG. 1 is a perspective view of a valve actuator of the present invention coupled to a valve mechanism controlled by that valve actuator with the housing of the valve actuator partially removed so as to reveal an improved positional indicator situated therein.

Referring first to FIG. 1, a valve actuator of the present invention is shown generally at 10. The valve actuator 10 is used to control the operation of a valve mechanism shown generally at 12. The valve actuator 10 is connected to the valve mechanism 12 by means of a mounting bracket 14. The valve mechanism 12 controls the flow of fluid in a fluid passageway defined by a conduit 16.

As shown in FIG. 1, the valve mechanism 12 includes a valve member 18 which is rotationally mounted within the conduit 16 and which is capable of being rotated to various angular positions within that conduit 16, one such position shown in full and another shown in phantom.

The valve member 18 of the valve mechanism 12 is rotationally mounted within the conduit 16 on a valve shaft 20.

A valve arm 22 is connected to the valve shaft 20. In the situation in which the present invention finds its greatest utility, the valve arm 22 and the valve member 18 to which it is connected rotate through an angle of at least 90°. Rotation of the valve arm 22 is caused by movement of a connecting linkage 24 mechanically linking the valve mechanism 12 with the valve actuator 10. The connecting linkage 24 is coupled to the valve arm 22 by a pin 25.

As shown in FIG. 1, the valve actuator 10 includes an actuator housing 26. Coupled to the actuator housing is a motor housing 28 in which is situated an electric motor (not shown). The electric motor of the valve actuator 10 drives an actuator shaft 30 which projects from the actuator housing 26. Coupled to the actuator shaft 30 is an actuator arm 32. Rotation of the actuator shaft 30 causes angular rotation of the actuator arm 32. In the environment in which the present invention finds its greatest utility, the actuator arm 32 is required to rotate through an angle exceeding 90°. Connected to the actuator arm by means of a connecting pin 34 is the aforementioned connecting linkage 24. Thus, as is evident, rotation of the actuator shaft 30 causes rotation of the actuator arm 32 and, therefore, in turn causes rotation of the valve member 18 within the conduit 16 by force transmitted by the connecting linkage 24.

As may perhaps be apparent from FIG. 1, the distance between the valve shaft 20 and the pin 25 is different from the distance between the actuator shaft 30 and the pin 34. Because of this fact, rotation of the actuator arm 30 through a first angle, e.g., an angle exceeding 90°, causes rotation of the valve arm 22 through a lesser angle and, in turn, provides a mechanical advantage. This mechanical advantage is useful in order to permit the actuator 10 to close the valve member 18 against great fluid pressures.

In accordance with the present invention, also projecting from the actuator housing 26 is a positional indicator housing 36. Situated within the positional indicator housing 36 is a positional indicator means 37 which senses and provides an indication of the angular position of the actuator shaft 30 with respect to the actuator housing 26 and, therefore, also of the angular position of the valve member 18 with respect to the conduit 16. The positional indicator means 37 includes a positional indicator shaft 38 which is coupled to the actuator shaft 30 such that angular rotation of the actuator shaft 30 causes a corresponding angular rotation of the positional indicator shaft 38. The positional indicator means 37 also includes a positional indicator circuit board 40 (FIG. 2) on which is situated a positional indicator circuit which will be described in connection with FIG. 6 below.

Figure 2:
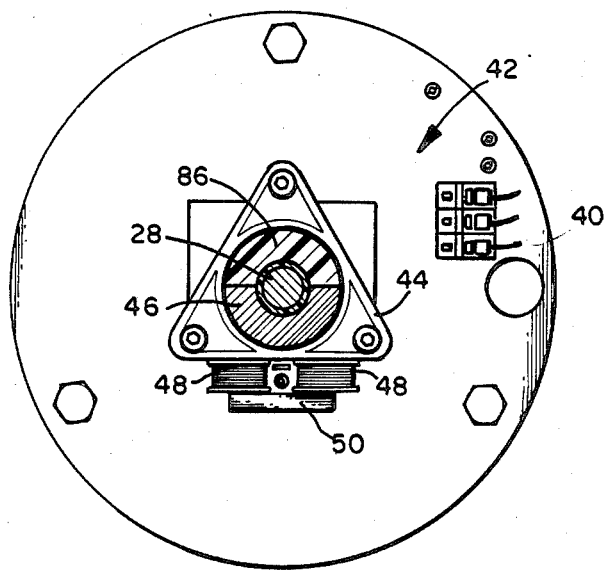
FIG. 2 is a cross-sectional view of the valve actuator of FIG. 1 taken along section lines 2—2, and showing an end view of the rotor and stator of the positional indicator of the present invention.

In accordance with the most important aspect of the present invention, the positional indicator circuit on circuit board 40 is inductively coupled to the positional indicator shaft 38. To accomplish this objective, the positional indicator means 37 of the present invention includes a rotor/stator assembly 42 (FIG. 2). The stator of the rotor/stator assembly is fixed with respect to the positional indicator circuit board 40, whereas the rotor of the rotor/stator assembly 42 is fixed with respect to the positional indicator shaft 38 and is, therefore, rotationally mounted with respect to the stator. The rotor/stator assembly 42 will be more fully understood by reference to FIGS. 2-5 below.

Referring first to FIG. 2, the stator 44 of the rotor/stator assembly 42 is shown as attached to the positional indicator circuit board 40. As shown in FIG. 2, the stator 44 has a central bore 46 in which a rotor 86 is rotationally mounted. The rotor 86 is coupled to the positional indicator shaft 38 in a manner which will be more fully described below. The longitudinal axis of the central bore 46 having a longitudinal axis which corresponds with the longitudinal axis of the rotor and of the positional indicator shaft 38. As shown, windings 74 and 76 are provided which energize the stator 44, the windings being electrically connected to the positional indicator circuit board 40. Also shown in FIG. 2, is a return flux path 50 which will be more fully described below.

Figure 5:
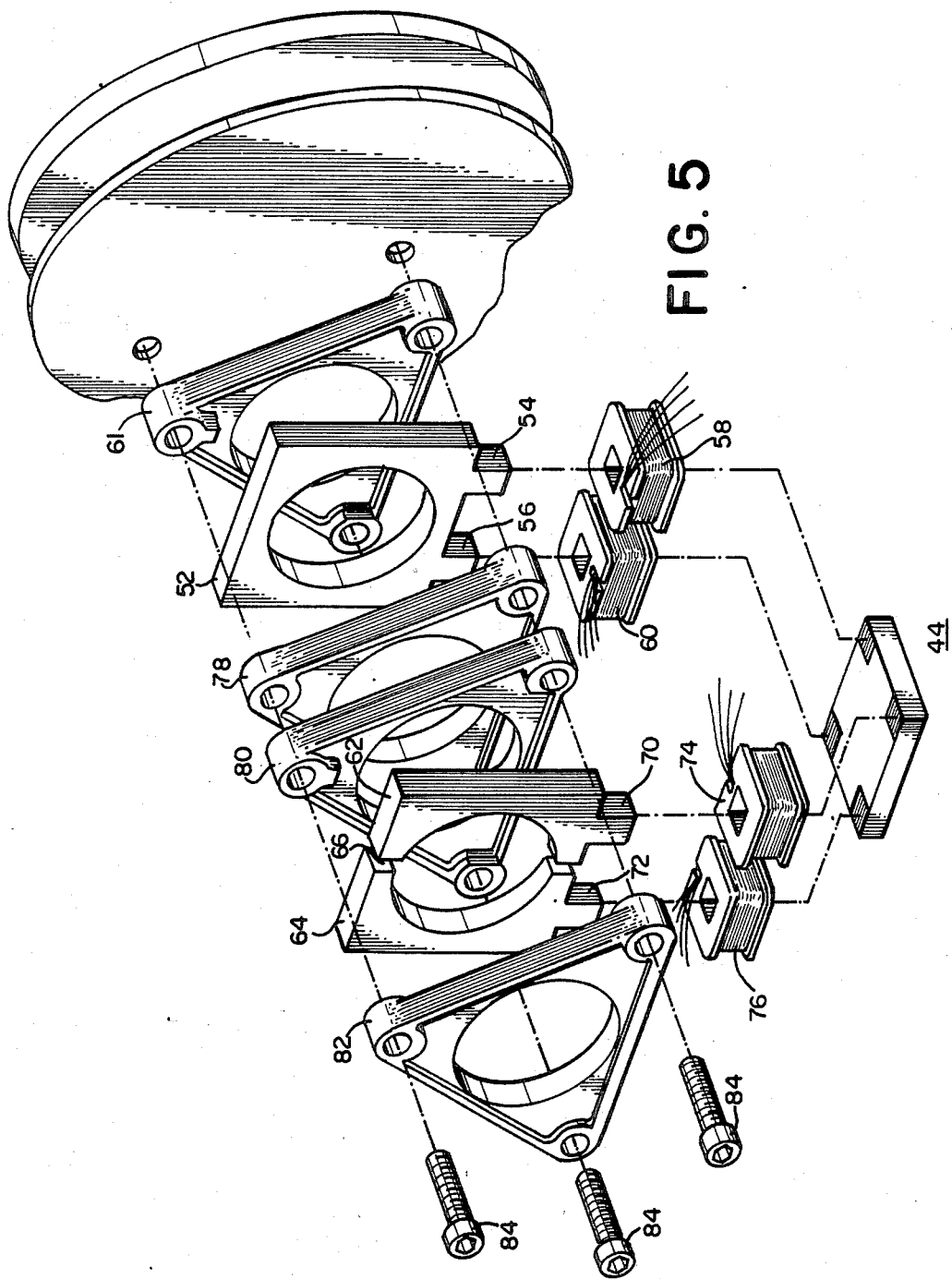
FIG. 5 is an exploded view of the rotor and stator assemblies of FIGS. 2-4 with the positional indicator shaft removed therefrom for ease of illustration.

The various details of the stator 44 may best be seen in the exploded view of FIG. 5. As shown in FIG. 5, the stator 44 is shown removed from the positional indicator circuit board 40. The stator 44 comprises a driving pole piece 52 having a central opening with a diameter corresponding to the diameter of the central bore 46 of the stator 44 as referred to above. With the rotor 86 in place in the central opening of the driving pole piece 52, the pole piece 52 completely surrounds the rotor 86. The driving pole piece thus forms a bearing surface within which the rotor and shaft rotate which is useful in eliminating alignment problems. The driving pole piece 52 is formed of ferromagnetic material and has two depending projections 54 and 56. Surrounding projection 54 is a first driving winding 58, and surrounding the second projection 56 is a second drive winding 60. The driving pole piece 52 is separated from the positional indicator circuit board 40 by means of a first insulating spacer 61.

The stator 44 shown in FIG. 5 also includes a first sensing pole piece 62 which partially defines the central bore 46 of the completed stator assembly. A second sensing pole piece 64 is also provided which partially defines the central bore 46. The first and second sensing pole pieces adjoin and complement one another to substantially, but not completely, surround the rotor 86. As will be more fully explained below, the rotor 86 is rotationally mounted within the aforementioned central bore 46 of the stator and is inductively coupled to the respective pole pieces 52, 62 and 64.

In accordance with an important aspect of the present invention, the first sensing pole piece 62 and second sensing pole piece 64 are separated by a small air gap 68. The first sensing pole piece 62 has a depending projection 70, whereas the second sensing pole piece 64 has a depending projection 72. Surrounding the first depending projection 70 is a first sensing winding 74 and surrounding the second depending projection 72 is a second sensing winding 76. The first and second sensing windings 74 and 76 are electrically connected to the aforementioned positional indicator circuit board 40. As shown in FIG. 5, the driving pole piece 52 and the sensing pole pieces 62 and 64 are separated from each other by means of a second and a third spacer 78 and 80, respectively. A fourth spacer 82 is provided on the outboard end of the stator 44 and the various spacers and pole pieces are joined to form a unitary body which is attached to the aforementioned positional indicator circuit board 40 by means of fasteners 84. Finally, the various depending projections 54, 56, 70 and 72 from the pole pieces are coupled to a return flux path member 50 as shown.

Referring now to FIGS. 3 and 4, the rotor 86 which is rotationally mounted within the central bore 46 of the stator 44 shown in FIG. 5 will be described in detail. The rotor 86 is affixed to the positional indicator shaft 38 by means of a clamp fit 88. In accordance with an important aspect of the present invention, the rotor includes a magnetically active sector 90 and a magnetically inactive sector 92 formed of an insulating material such as polysulfone. As shown in FIG. 4, the magnetically active sector 90 and the magnetically inactive sector 92 of the rotor form a generally cylindrically shaped body having a central annular opening in which the positional indicator shaft 38 is situated. As seen in FIG. 4, the magnetically active sector 90 of the rotor 86 extends about 180° around the peripheral surface of the cylindical body, whereas the magnetically inactive sector 92 of the rotor 86 extends about 180° around the remainder of the peripheral surface of the cylindrical body, i.e., the sectors 90 and 92 are diametrically opposed with respect to one another.

As may be appreciated from FIG. 4, as the rotor 86 rotates in a clockwise direction as shown by arrow 94, an increasing current is induced in the second sensing pole piece 64, and a decreasing current is induced in the first sensing pole piece 62. Moreover, as the rotor 86 rotates counter-clockwise in the direction of arrow 96, an increasing current is induced in the first sensing pole piece 62 and a decreasing current is induced in the second sensing pole piece 64. As will be more fully explained below, a positional indicator circuit 100 (FIG. 6) situated upon positional indicator circuit board 40 generates an output signal in response to the difference in the currents induced in pole pieces 62 and 64. This output signal varies in accordance with the angular position of the rotor 86, even though the rotor may turn through an angle exceeding 90°.

Figure 6:
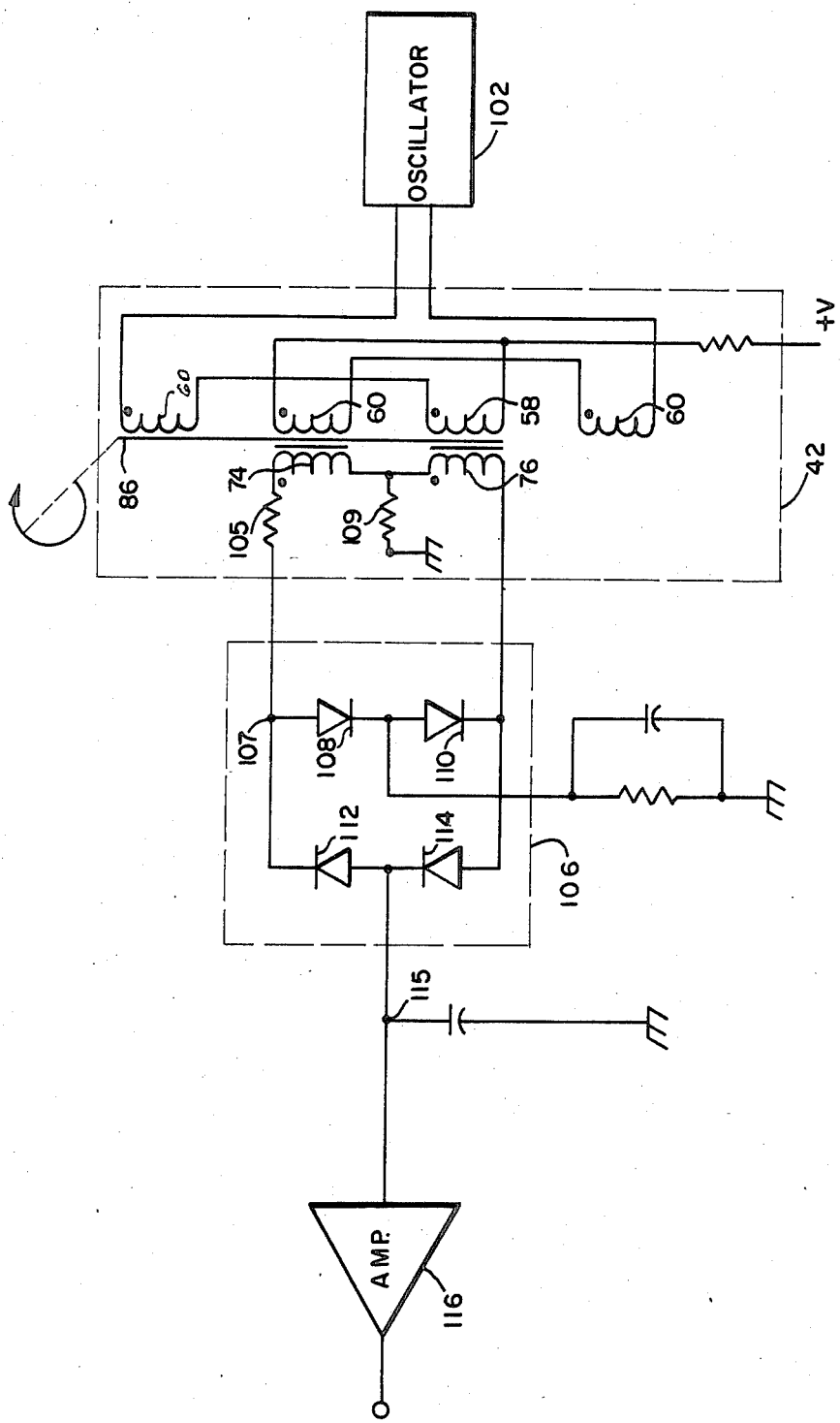
FIG. 6 is a schematic circuit diagram of the positional indicator circuit of the present invention.

Referring now to FIG. 6, the positional indicator circuit 100 will be described in detail. As shown in FIG. 6, the positional indicator circuit 100 includes an oscillator 102 which preferably comprises an integrated circuit Model No. SG 1525 manufactured by Silicon General which generates an oscillating signal applied to the stator/rotor assembly 42. Specifically, the output of the oscillator circuit 102 is directed to drive windings 58 and 60. The drive windings 58 and 60 are inductively coupled to the first and second sensing windings 74 and 76. The current induced in the first and second sensing windings 74 and 76 is a function of the rotational position of the rotor 86. The low voltage side of the first sensing winding 74 and the high voltage side of the second sensing coil 76 are each connected to ground via a resistor 109.

The current output of the stator/rotor assembly 42 is thus connected to a demodulator circuit 106 which preferably comprises a diode matrix comprised of diodes 108, 110, 112 and 114.

The high voltage side of the first sensing coil is connected to a first input 107 of the demodulator circuit 106 via resistor 105 and the low voltage side of the second sensing coil 76 is conneced to a second input 109 of the demodulator 106 via resistor 111.

Diodes 108, 110, 112 and 114 are arranged such that the current at node 115 varies in accordance with the difference between the current induced in the first sensing coil 74 and the second sensing coil 76. The output of the demodulator circuit 106 is then directed to a standard amplifier 116 such as, for example, Model No. 1558 by Motorola, Inc., which amplifies that signal to produce an output signal at terminal 118 which varies in accordance with the angular position of the rotor 86 with respect to the stator 44 and, therefore, in accordance with the angular position of the actuator shaft 80.

While a particular embodiment of the present invention has been shown and described, it will be appreciated that other modifications to the present invention may occur to those skilled in the art and any all such modifications are to be embraced within the scope of the appended claims.

What is claimed is:

1. A valve actuator for controlling and sensing the rotational position of a valve member comprising:

an actuator motor for rotating an actuator shaft;

an actuator arm coupled to said actuator shaft, the rotation of said actuator shaft causing rotation of said actuator arm through an angle exceeding 90°;

a linkage connecting said actuator arm to said valve mechanism, the rotation of said actuator arm causing movement of said linkage and, in turn, rotation of said valve member; and a positional indicator means or sensing the angular position of said actuator shaft, said positional indicator means including:

a positional indicator shaft coupled to said actuator shaft such that angular rotation of said actuator shaft causes a corresponding angular rotation of said positional indicator shaft;

a rotor/stator assembly including a rotor coupled to a said indicator shaft whereby said rotor includes a magnetically active sector located about a portion of the peripheral surface of said rotor, and a magnetically inactive sector located about another portion of the peripheral surface of said rotor; and a stator comprising a first sensing pole piece partially surrounding said rotor, a second sensing pole piece partially surrounding said rotor, and a driving pole piece, said rotor being mounted for rotation with respect thereto, said rotor varying the inductive coupling in the stator; and a positional indicator circuit responsive to said rotor/stator assembly for generating an analog output signal which varies in accordance with the angular position of said rotor with respect to said stator and, therefore, in accordance with the angular position of said actuator shaft.

2. The valve actuator of claim 1 wherein:
said stator defines a central bore, said rotor being rotationally mounted within said bore.

3. The valve actuator of claim 1 wherein said magnetically active sector and said magnetically inactive sector of said rotor are diametrically opposed from each other on the peripheral surface of said body.

4. The valve actuator of claim 1 wherein:
said magnetically active sector of said rotor extends about 180° around the peripheral surface of said cylindrical body, said magnetic active sector of said motor being adjacent to said first and said second sensing pole piece and to said driving pole piece.

5. The valve actuator of claim 4 wherein said positional indicator circuit includes:
a demodulator means for generating a signal proportional to the difference between current induced in said first sensing pole piece and current induced in said second sensing pole piece.

6. The valve actuator of claim 5 wherein said positional indicator circuit further comprises:
an amplifier circuit coupled to said demodulator circuit for amplifying said signal to form said output signal.

7. The valve actuator of claim 1 wherein said stator further comprises:
a driving pole piece completely surrounding said rotor assembly.

8. The valve actuator of claim 3 wherein said positional indicator circuit further comprises:
an oscillator means coupled to said driving pole piece.

* * * * *